United States Patent [19]

Boggs

[11] 4,068,698
[45] Jan. 17, 1978

[54] VEHICLE WHEEL HAVING RADIALLY MOVABLE IMPACT ABSORBING RIMS

[75] Inventor: Roger L. Boggs, East Peoria, Ill.

[73] Assignee: Caterpillar Tractor Co., Peoria, Ill.

[21] Appl. No.: 713,078

[22] Filed: Aug. 9, 1976

[51] Int. Cl.² .................... B62D 55/12; B60B 9/12
[52] U.S. Cl. ............................ 152/27; 305/57
[58] Field of Search .............. 305/21, 24, 28, 57, 305/56; 152/21, 22, 27, 47, 49, 52

[56] References Cited

U.S. PATENT DOCUMENTS

| | | | |
|---|---|---|---|
| 747,343 | 12/1903 | Ahlquist | 152/22 X |
| 980,226 | 1/1911 | Ellis | 152/27 |
| 1,055,709 | 3/1913 | Cheeseman | 152/27 X |
| 1,107,916 | 8/1914 | Denis | 152/27 |

Primary Examiner—Robert B. Reeves
Assistant Examiner—John P. Shannon
Attorney, Agent, or Firm—Frank L. Hart

[57] ABSTRACT

A vehicle wheel has rims that are radially movable relative to the hub in response to forces acting on the rim. The rim is biased by resilient material to return to its normal position in response to removal of the force on the rim.

11 Claims, 6 Drawing Figures

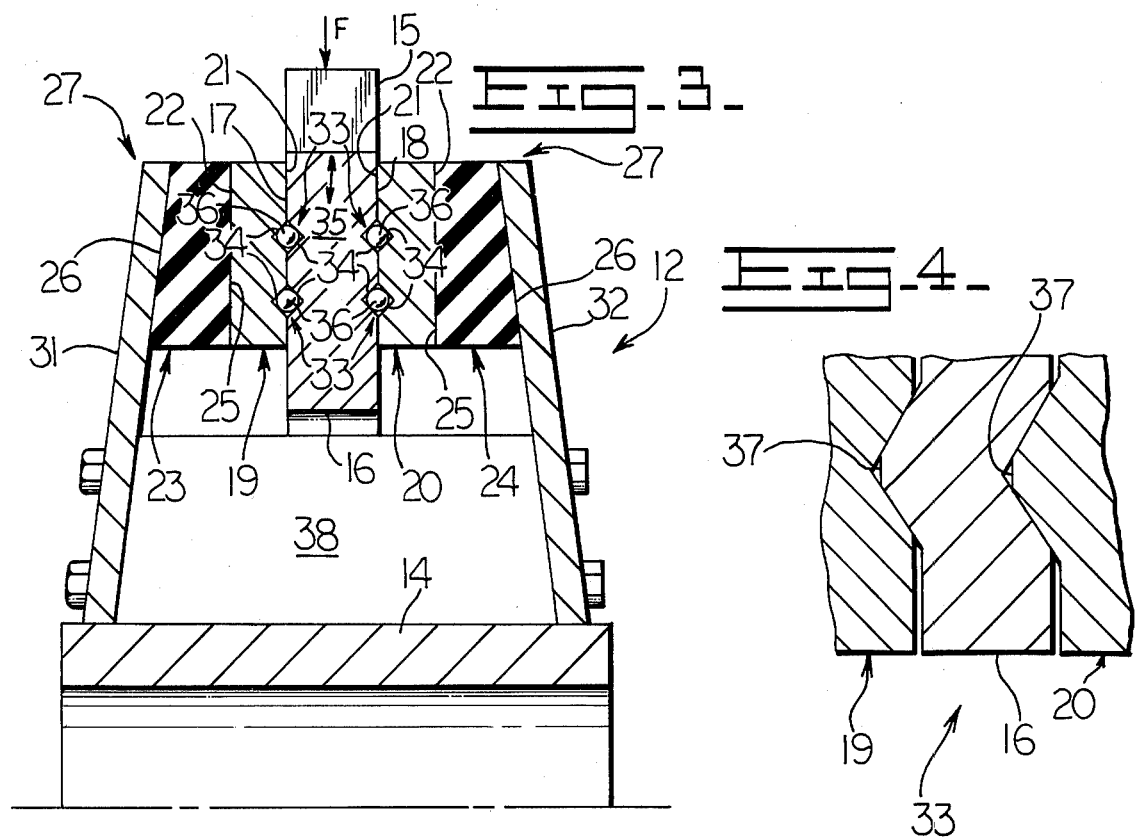
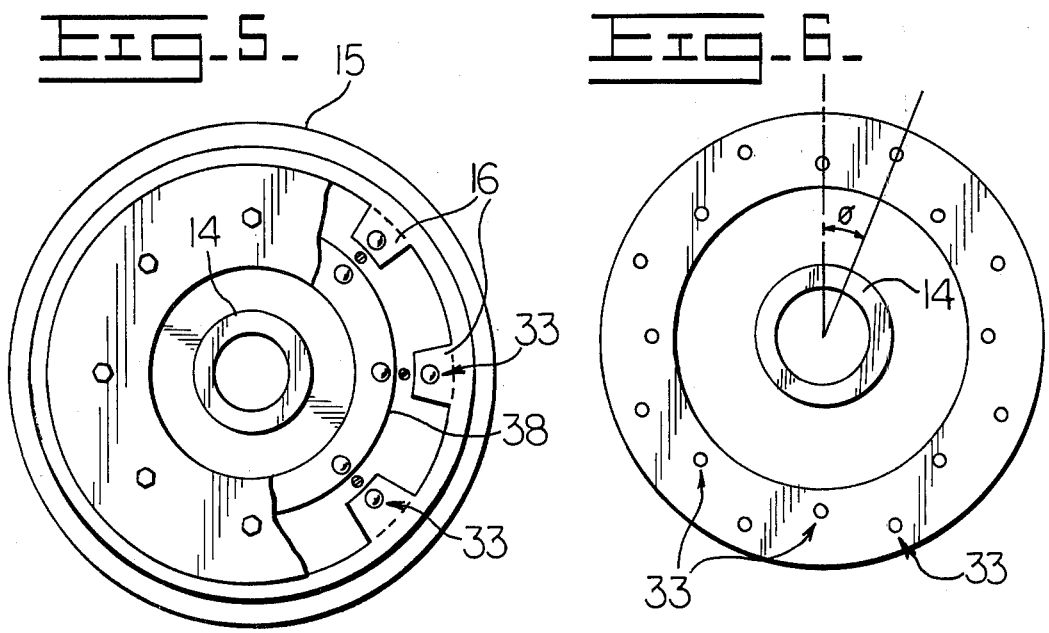

VEHICLE WHEEL HAVING RADIALLY MOVABLE IMPACT ABSORBING RIMS

BACKGROUND OF THE INVENTION

During operation of a vehicle, for example a crawler-type vehicle, the continuous tread sometimes impacts the supporting and drive wheels with forces sufficient to generate undesirable wear and noise. This invention therefore resides in apparatus for cushioning forces acting on the wheel rim by providing for controlled radial movement of the rim in response to forces subjected onto the rim.

BRIEF DESCRIPTION OF THE DRAWINGS

FIG. 3 is a diagrammatic partial sectional view of a portion of another embodiment of this invention;

FIG. 4 is a diagrammatic sectional view of another embodiment of the compression means;

FIG. 5 is a diagrammatic side view of one embodiment of the wheel of FIG. 2; and FIG. 6 is a diagrammatic side view of another embodiment of the wheel of FIG. 2.

DETAILED DESCRIPTION OF THE INVENTION

Figure 1:
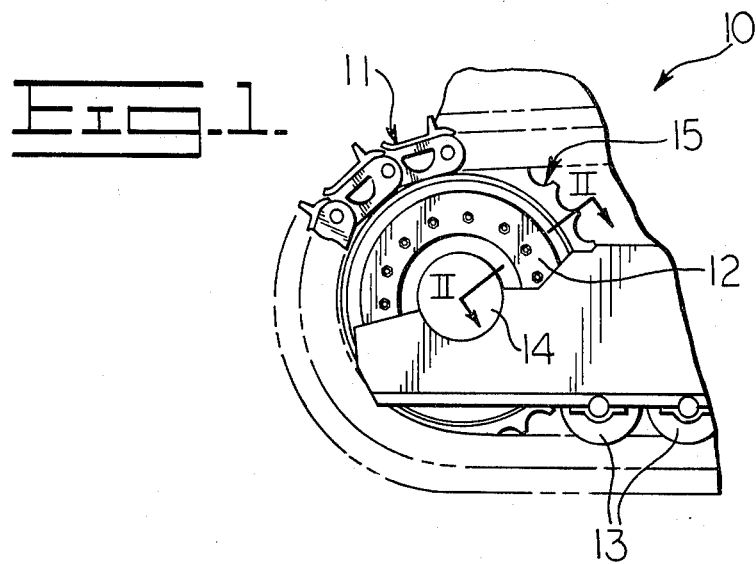
FIG. 1 is a diagrammatic side view of a portion of a work vehicle having the apparatus of this invention.

Referring to FIG. 1, a crawler-type work vehicle 10, such as a crawler tractor, has continuous treads 11 that are driven by a sprocket wheel 12 and supported by a plurality of other wheels 13, as is known in the art. This invention can be used on any of the wheels but reference will hereafter be made only to the sprocket wheel 12 for purposes of brevity.

Figure 2:
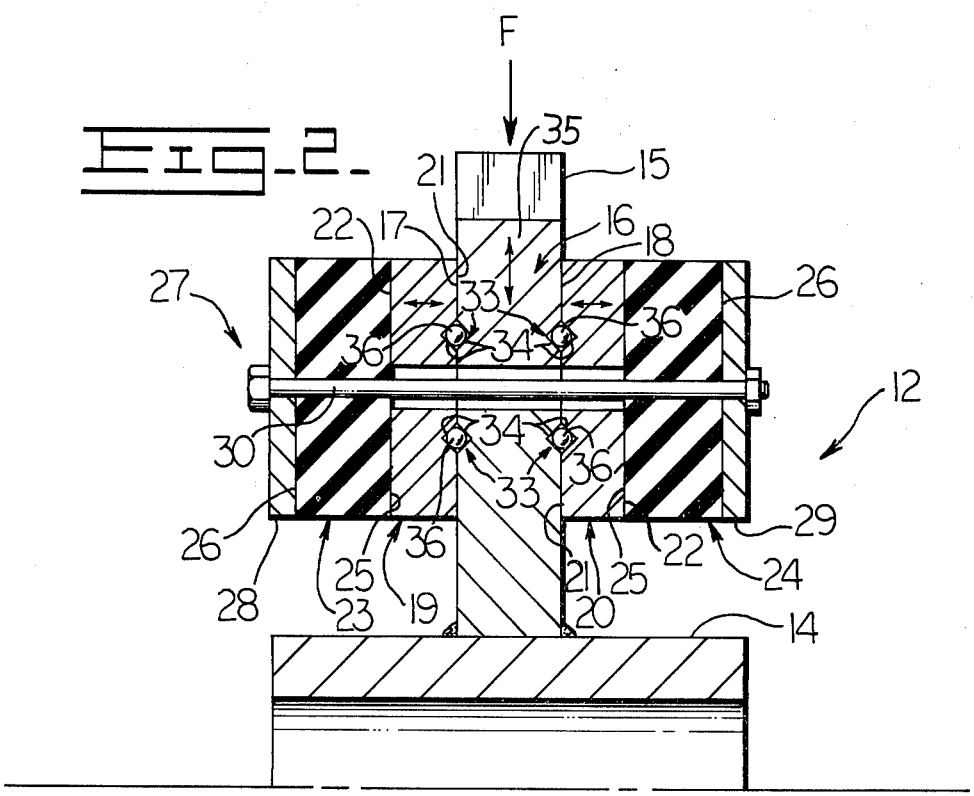
FIG. 2 is a diagrammatic partial sectional view of a portion of one embodiment of the wheel of this invention.

Referring to FIGS. 2 and 3, the wheel 12 has a hub 14 connected to a rim 15, portions of which are controllably radially movable in directions toward and from the hub 14 in response to forces "F" acting thereupon.

A flange 16 extends inwardly from the rim 15 in a direction toward the hub 14. The flange 16 has first and second opposed sides 17,18 and can be either a continuous flange as shown in FIGS. 2 and 3, or can be a plurality of separate flanges as shown by broken lines in FIG. 5.

First and second floating plates 19,20 are each positioned on a respective side 17,18 of a respective rim flange 16. Each of the floating plates 19,20 have first and second sides and are formed of a rigid material such as steel. The floating plates 19,20 are each positioned with their first side 21 immediately adjacent a respective side 17,18 of the flange 16.

First and second biasing means 23,24 are each positioned on the second side 22 of a respective floating plate 19,20. The biasing means 23,24 each have first and second sides 25,26 and the second sides 26 are each directed outwardly from the floating plates 19,20.

Means 27 are provided for maintaining the first and second biasing means 23,24 at preselected relative positions. In the embodiment of FIG. 2, the maintaining means 27 comprises first and second load plates 28,29 each positioned on a second side 26 of a respective biasing means 23,24 and an element 30 extending through the load plates 28,29, biasing means 23,24, and float plates 19,20. In this embodiment, the element 30 is adjustable for controllably exerting compression forces of a preselected magnitude on the biasing means 23,24 in the installed position. In the embodiment of FIG. 3, the maintaining means 27 comprises first and second panels 31,32 each connected to the hub 14 and to a second side 26 of a respective biasing means 23,24. The biasing means 23,24 and panels can be connected by any means known in the art, for example bonding said biasing means to the panels.

Means 33 are provided for compressing the biasing means 23,24 in response to movement of portions of the rim 15 radially toward and from the hub 14. In the embodiment of FIG. 2, the compressing means 33 compresses a plurality of mating pairs of tapered seats 34 on the rim flange 16 and floating plates 19,20, a flange 35 extending from the rim 15 to a location between the floating plates 19,20, a plurality of maintaining pairs of tapered seats 34 on the hub flange 35 and floating plates, and a spherical element 36, such as a steel ball, positioned in each pair of tapered seats 34. In the embodiment of FIG. 4, a tapered protrusion 37 is formed on the flange 16 and/or floating plates 19,20, and are mateable with adjacent tapered seats on the other of said flange 16 or floating plate 19,20 in the substantially coaxial position of the rim 15 relative to the hub 14. In this embodiment the protrusion 37 is replacing the spherical element 36 and one of the seats 34 of FIGS. 2 and 3. It should also be understood that the seat 34 —protrusion 37 assembly and the double seat 34—spherical element 36 assembly can both be on the same wheel without departing from this invention.

FIGS. 5 and 6 show embodiments where the plurality of compressing means 33 are arranged in first and second annular rows, each spaced a preselected distance from adjacent means 33 of the respective row. In the embodiment of FIG. 5, means 33 of the second row are positioned in the radial plane of a respective means 33 of the first row for increasing the resistance to the force "F". In the embodiment of FIG. 6, the menas 33 of the first row are arcuately spaced from adjacent means 33 of the second row.

Referring to FIG. 3, stop element 38 can be provided for limiting the magnitude of movement of the rim 15 toward the hub 14. Referring to FIG. 2, the relationship of the size of space between the rim flange 16 and the element 30 controls the amount of rim movement.

In the operation of the apparatus of this invention, radial movement of a portion of the rim 15 in response to an impact force subjected thereupon causes the spherical elements 36 to move along their respective tapered seats 34, bias their respective floating plate outwardly, and compress the respective biasing means 23,24, thereby causing resisting forces to be passed through the floating plate, spherical elements and onto the rim 15. As can be seen by a study of the drawings, movement of the rim in any direction acts upon all of the spherical elements associated with the rim flange. Any movement of the floating plate acts upon the biasing means, and in the embodiment of FIG. 2 the spherical elements associated with the hub flange 35. Owing to the angle of the seats 34, forces subjected onto the floating plate therefore cause the plate to be moved to different attitudes relative to the vertical in response to the arcuate displacement of the spherical elements relative to the location at which the force is applied onto the rim and the direction of the applied force. By this construction, movement of the rim portion upon which the force is subjected is maintained in general radial direction irrespective of the attitude of the force direction relative to to the radial plane of the wheel.

Other aspects, objects, and advantages of this invention can be obtained from a study of the drawings, the disclosure, and the appended claims.

What is claimed is:

1. Wheel apparatus, comprising:
a hub;
a movable rim connected to said hub;
a flange extending inwardly from the rim in a direction toward the hub, said flange having first and second opposed sides;
first and second floating plates each having first and second sides and being positioned on a respective side of said rim flange, said first sides being positioned closer to said rim flange than said second sides;
first and second biasing means each having first and second sides and being positioned on the second side of a respective floating plate with the biasing means second side being directed outwardly therefrom;
means for maintaining the first and second biasing means at preselected relative locations, said maintaining means including first and second load plates each positioned on the second side of the respective biasing means and an element movably attached to said plates, said element being adjustable for controllably exerting compression forces of a preselected magnitude on the biasing means in the installed position; and
means for compressing the biasing means in response to movement of portions of the rim radially toward and from the hub.

2. Apparatus, as set forth in claim 1, wherein the rim flange is an annular continuous flange.

3. Apparatus, as set forth in claim 1, wherein there are a plurality of spaced apart rim flanges.

4. Apparatus, as set forth in claim 1, wherein the compression means comprises:
a plurality of mating pairs of tapered seats on the rim flange and floating plate; and
a spherical element positioned in each pair of tapered seats.

5. Apparatus, as set forth in claim 1, wherein the compression means comprises:
a plurality of tapered seats on one of the rim flange or floating plates; and
a plurality of tapered protrusions on the other of the rim flange or floating plates each at a location sufficient for mating with a respective seat in the substantially coaxial position of the rim relative to the hub.

6. Apparatus, as set forth in claim 1, wherein there are a first plurality of compression means spaced one from the other preselected arcuate distances; and
a second plurality of compressing means spaced one from the other preselected arcuate distances.

7. Apparatus, as set forth in claim 6, wherein the second plurality of compression means are each positioned in the radial plane of the first plurality of compression means.

8. Apparatus, as set forth in claim 6, wherein the second plurality of compression are each arcuately spaced from the radial planes of the first plurality of compression means.

9. Apparatus, as set forth in claim 1, including:
means for limiting the magnitude of movement of a portion of the rim toward the hub.

10. Wheel apparatus, comprising:
a hub;
a movable rim connected to said hub;
a flange extending inwardly from the rim in a direction toward the hub, said flange having first and second opposed sides;
first and second floating plates each having first and second sides and being positioned on a respective side of said rim flange, said first sides being positioned closer to said rim flange than said second sides;
first and second biasing means each having first and second sides and being positioned on the second side of a respective floating plate with the biasing means second side being directed outwardly therefrom;
means for maintaining the first and second biasing means at preselected relative locations;
means for compressing the biasing means in response to movement of portions of the rim radially toward and from the hub,
said compression means including:
a plurality of mating pairs of tapered seats on the rim flange and floating plates;
a flange extending outwardly from the hub to a location between the floating plates;
a plurality of mating pairs of tapered seats in the hub flange and floating plates; and
a spherical element positioned in each pair of tapered seats.

11. Wheel apparatus, comprising:
a hub;
a movable rim connected to said hub;
a flange extending inwardly from the rim in a direction toward the hub, said flange having first and second opposed sides;
first and second floating plates each having first and second sides and being positioned on a respective side of said rim flange, said first sides being positioned closer to said rim flange than said second sides;
first and second biasing means each having first and second sides and being positioned on the second side of a respective floating plate with the biasing means second side being directed outwardly therefrom;
means for maintaining the first and second biasing means at preselected relative locations;
means for compressing the biasing means in response to movement of portions of the rim radially toward and from the hub,
said compression means including:
a plurality of tapered seats on one of the rim flange or floating plates;
a plurality of tapered protrusions on the other of the rim flange or floating plates each at a location sufficient for mating with a respective seat in the substantially coaxial position of the rim relative to the hub;
a flange extending outwardly from the hub to a location between the floating plates;
a plurality of tapered seats on one of the floating plates or hub flange; and
a plurality of tapered protrusions on the other of the floating plates or hub flange at a location sufficient for mating with a respective seat in the substantially coaxial position of the rim relative to the hub.

* * * * *